(12) United States Patent
Fossen

(10) Patent No.: US 6,705,718 B2
(45) Date of Patent: Mar. 16, 2004

(54) SPECTACLE FRAMES WITH IMPROVED STRATIFORM COATING

(75) Inventor: Ernesto Fossen, Rivamonte Agordino (IT)

(73) Assignee: Luxottica S.r.l., Agordo (IT)

( * ) Notice: Subject to any disclaimer, the term of this patent is extended or adjusted under 35 U.S.C. 154(b) by 0 days.

(21) Appl. No.: 10/106,106

(22) Filed: Mar. 27, 2002

(65) Prior Publication Data
US 2002/0149736 A1 Oct. 17, 2002

(30) Foreign Application Priority Data
Apr. 13, 2001 (IT) .................... BO2001A0218

(51) Int. Cl.⁷ ................................ G02C 1/00
(52) U.S. Cl. ........................................ 351/41
(58) Field of Search ........................... 351/41

(56) References Cited

U.S. PATENT DOCUMENTS

| | | | | |
|---|---|---|---|---|
| 4,472,035 A | * | 9/1984 | Takamura et al. ............ 351/41 |
| 5,182,172 A | * | 1/1993 | Tucker ........................ 428/632 |
| 5,510,173 A | * | 4/1996 | Pass et al. ................... 428/216 |
| 6,168,272 B1 | * | 1/2001 | Larrue ......................... 351/41 |
| 2002/0149736 A1 | * | 10/2002 | Fossen ......................... 351/41 |
| 2002/0160222 A1 | * | 10/2002 | Man et al. ................... 428/672 |

FOREIGN PATENT DOCUMENTS

| | | |
|---|---|---|
| DE | 35 01 163 | 8/1985 |
| EP | 0 555 062 | 8/1993 |
| JP | 61 035 417 | 2/1986 |
| JP | 61 035 419 | 2/1986 |

* cited by examiner

Primary Examiner—Huy Mai
(74) Attorney, Agent, or Firm—Arent Fox Kintner Plotkin & Kahn

(57) ABSTRACT

The spectacle frames comprise a plurality of frame elements, such as earpieces, rims, bridges and other parts, which form the structure. These elements of the structure are made of metal and their surfaces are protected by a stratiform electrochemical coating. Advantageously, the coating comprises a layer of copper, on top of which a layer of silver is preferably applied.

20 Claims, No Drawings

SPECTACLE FRAMES WITH IMPROVED STRATIFORM COATING

BACKGROUND OF THE INVENTION

The present invention relates to spectacle frames.

In particular, the present invention relates to spectacle frames which have been subjected to galvanic surface treatments.

Spectacle frames normally comprise a plurality of elements or components, such as the earpieces, rims, bridge, double bridge and other parts, which are made of metal, such as steel, stainless steel, bronze, nickel silver, Monel metal and other alloys.

Such frames have a stratiform coating designed to protect the metal below in cathodic fashion, extending the life of the frames, and at the same time giving the frames a desired appearance.

At present, the coating normally consists of a layer of nickel, designed to protect the material below and, simultaneously, to form a particularly smooth outer surface without any roughness from processing. This layer of nickel is covered with a finishing layer made of palladium, gold, chrome or another material which gives the frames the desired appearance. A layer of varnish may be applied to the latter, metal layer.

However, these coatings on spectacle frames have the disadvantage of releasing an excessive amount of nickel, with the risk of causing health problems for the spectacles wearer.

Moreover, in these conventional frames the corrosion strength obtained with such a coating is not strong enough, except in the case of excessively thick coatings. Therefore, the frame production costs are too high.

These corrosion problems are mainly due to the fact that the layer of nickel is quite rigid, and, when the frames are subject to elastic deformation, it tends to develop cracks or fissures in the coating, which allow the penetration of corrosive agents.

SUMMARY OF THE INVENTION

To overcome these problems, the present invention provides spectacle frames, as described in claim 1, comprising a plurality of frame elements, such as the earpieces and means which support the lenses, in which the frame elements consist of a core, preferably made of a metal material, and a stratiform coating. The frames are characterised in that the stratiform coating comprises a layer of copper. This layer of copper fully or partially substitutes the nickel layer used on conventional frames. This copper layer not only provides good corrosion strength, but also prevents all the harmful effects caused by the release of nickel in conventional frames.

DESCRIPTION OF THE PREFERRED EMBODIMENTS

According to a particularly advantageous aspect, described in claim 2, the coating also comprises a layer of silver, which is applied on top of the layer of copper.

This coating configuration allows optimum protection against corrosion.

The copper and silver layers allow the obtainment of a particularly homogeneous and elastic coating, which follows bending deformation of the frame parts without cracking or splitting. Thus, a particularly compact and even coating is obtained, which is free of cracks and fissures.

As a result, penetration by external corrosive agents is impossible. Optimum protection is obtained for the material which forms the core of the frames.

The other claims describe other advantageous aspects of the present invention.

In particular, the thickness of the layer of copper is between $0.1\mu$ and $15\mu$, preferably between $5\mu$ and $10\mu$, whilst the layer of silver, in turn, is between $0.1\mu$ and $15\mu$ thick, preferably between $5\mu$ and $10\mu$.

The corrosion strength of the present coating is also advantageous thanks to the fact that the difference in potential, evaluated in conditions—described in more detail below—simulating a condition of use of the frames, between the layer of copper and the layer of silver is less than 200 millivolts.

Therefore, partly thanks to this, the corrosion strength of the frames with this coating is particularly high.

The layer of silver, applied on top of the layer of copper, may be covered with one or more layers whose purpose is mainly decorative.

A layer of gold is, therefore, preferably applied over the layer of silver.

Said layer of gold is preferably between $0.1\mu$ and $2\mu$ thick.

Again, the corrosion strength of such a coating is particularly high, thanks to the fact that the difference in potential, evaluated in conditions—described in more detail below—simulating a condition of use of the frames, between the layer of silver and the layer of gold is less than 200 millivolts.

In order to obtain frames with a light grey colour, a layer of palladium is also applied, which may be deposited on top of the layer of gold or, if necessary, on top of the layer of silver.

The layer of palladium is preferably between $0.1\mu$ and $2\mu$ thick.

For frames which are a darker shade of grey, another layer, of ruthenium, preferably between $0.1\mu$ and $0.2\mu$ thick, is applied over the layer of palladium.

From the potentiostatic viewpoint, the present invention achieves a difference in potential between each layer and the next which is less than 200 millivolts.

These static potential values for the materials, which form the various layers in the present coating, were measured using the materials and methods of CASS corrosion tests or corrosion tests with artificial perspiration. These tests are well known to experts in the field and, therefore, do not require detailed descriptions here.

In this way, given the low difference in potential between the layers of the coating, protection against corrosion is optimum. In comparison with the layer of copper, the layer of silver has a rather low difference in potential, which gives this combination of layers significant corrosion strength.

In an alternative embodiment, the layer of palladium is applied directly to the layer of copper. In this case, the coating obtained not only eliminates the problem of nickel release, but also has a higher corrosion strength than that of known nickel and palladium coatings used before now.

In yet another embodiment, a thin layer of gold—around $0.1\mu$ thick—is applied to the layer of copper, protecting the layer of copper from oxidation, which may occur before the other, final layers in the coating can be applied. Until now, the use of a layer of copper, forming the main layer of the protective and decorative coating, was hindered by the fact that this material was easily oxidisable and, therefore, did not allow any significant wait, as often occurs in industrial processes, for the application of further decorative layers of coating.

The surface of the present coating can also be covered with a layer of varnish or similar material. The varnish may be epoxy or polyester, transparent or coloured.

The technical features of the present invention and the different advantageous aspects are described more clearly in the detailed description which follows, with reference to the preferred application examples, without limiting the scope of the invention.

EXAMPLE 1

The metal of which the frames are made is electrolytically covered with a coating which comprises a first layer made of copper, which is $10\mu$ thick, and a second layer made of palladium, which is $0.2\mu$ thick, on top of which an epoxy varnish is applied. These frames were subjected to a CASS corrosion test in a standard test solution for 150 hours, providing corrosion results which were acceptable and in any case, better than a similar control sample which had a $10\mu$ thick layer of nickel and a $2\mu$ thick layer of palladium.

EXAMPLE 2

The metal of which the frames are made is electrolytically covered with a coating which comprises a first layer made of copper, which is $5\mu$ thick, a second layer made of silver, which is $10\mu$ thick, and a third layer made of gold which is $0.2\mu$ thick.

The corrosion results, following a CASS test in a standard test solution for 150 hours, were excellent. There were no signs of corrosion on the frames, except at the points where the frames were connected to the support stand and to the electrolytic coating tanks electrode.

EXAMPLE 3

The metal of which the frames are made is electrolytically covered with a coating which comprises a first layer made of copper, which is $5\mu$ thick, a second layer made of silver, which is $5\mu$ thick and a third layer made of palladium which is $0.2\mu$ thick. The latter is coated with a transparent polyester varnish. The corrosion results, following a CASS test in a standard test solution for 150 hours, were excellent. There were no signs of corrosion on the frames, except at the points where the frames were connected to the support stand and to the electrolytic coating tanks electrode.

EXAMPLE 4

The metal (stainless steel) of which the frames are made is electrolytically covered with a coating which comprises a first layer made of copper, which is $10\mu$ thick, a second layer made of silver, which is $5\mu$ thick, a third layer made of palladium, which is $0.1\mu$ thick and a layer of ruthenium, which is $0.1\mu$ thick.

In particular, in this type of case, the overall difference in potential between the lower layer of the coating and the upper layer is 450 millivolts (mV). Therefore, the coating obtained has a significant corrosion strength.

EXAMPLE 5

The metal of which the frames are made is electrolytically covered with a coating which comprises a first layer made of copper, which is $5\mu$ thick, a second layer made of silver, which is $5\mu$ thick, a third layer made of gold which is $0.5\mu$ thick and a fourth layer made of palladium, which is $0.2\mu$ thick. The CASS resistance is high.

EXAMPLE 6

The metal of which the frames are made is electrolytically covered with a coating which comprises a first layer made of nickel, which is $3\mu$ thick, forming a particularly smooth outer surface, a second layer made of copper, which is $5\mu$ thick and a third layer made of palladium, which is $0.2\mu$ thick. The latter is coated with a transparent polyester varnish. The layer of copper, as well as having good corrosion strength, contains and prevents an appreciable release of nickel from the frames.

EXAMPLE 7

The metal of which the frames are made is electrolytically covered with a coating which comprises a first layer made of copper, which is $10\mu$ thick, on which a thin $0.1\mu$ layer of gold is deposited, forming a layer which protects the copper layer, which can wait for a given time before being coated with a subsequent layer of silver, which is $5\mu$ thick, on which $0.2\mu$ of palladium is deposited.

The invention described can be subject to numerous modifications and variations without thereby departing from the scope of the inventive concept. Moreover, all the details of the invention may be substituted by technically equivalent elements.

In particular, significant corrosion strength may be obtained with coating thicknesses which are not excessive.

What is claimed:

1. Spectacle frames including a plurality of frame elements, where the frame elements are made of metal, and a stratiform coating, said coating comprising a layer of copper and a layer of silver applied on top of the layer of copper.

2. The frames according to claim 1, wherein the layer of copper is between $0.1\mu$ and $15\mu$ thick.

3. The frames according to claim 2, wherein the layer of copper is between $5\mu$ and $10\mu$ thick.

4. The frames according to claim 1, wherein the layer of silver is between $0.1\mu$ and $15\mu$ thick.

5. The frames according to claim 4, wherein the layer of silver is between $5\mu$ and $10\mu$ thick.

6. The frames according to claim 1, wherein the coating comprises a layer of gold.

7. The frames according to claim 6, wherein the layer of gold is applied on top of the layer of silver.

8. The frames according to claim 7, wherein the layer of gold is between $0.1\mu$ and $2\mu$ thick.

9. The frames according to claim 6, wherein the layer of gold is applied on top of the layer of copper.

10. The frames according to claim 9, wherein the layer of gold is substantially $0.1\mu$ thick.

11. The frames according to claim 6, wherein the coating comprises a layer of palladium.

12. The frames according to claim 11, wherein the layer of palladium is applied on top of the layer of gold.

13. The frames according to claim 12, wherein the layer of palladium is between $0.1\mu$ and $2\mu$ thick.

14. The frames according to claim 11, wherein the layer of palladium is applied on top of the layer of silver.

15. The frames according to claim 11, wherein the layer of palladium is applied on top of the layer of copper.

16. The frames according to claim 11, wherein the coating has a layer of ruthenium applied on top of the layer of palladium.

17. The frames according to claim 16, wherein the layer of ruthenium is between $0.1\mu$ and $2\mu$ thick.

18. A frame element having a coating according to claim 1.

19. Spectacle frames including a plurality of frame elements, where the frame elements are made of metal, and a stratiform coating, said coating comprising a layer of copper and a layer of gold applied on top of the layer of copper.

20. Spectacle frames including a plurality of frame elements, where the frame elements are made of metal, and a stratiform coating, said coating comprising a layer of copper and a layer of palladium applied on top of the layer of copper.

* * * * *